UNITED STATES PATENT OFFICE.

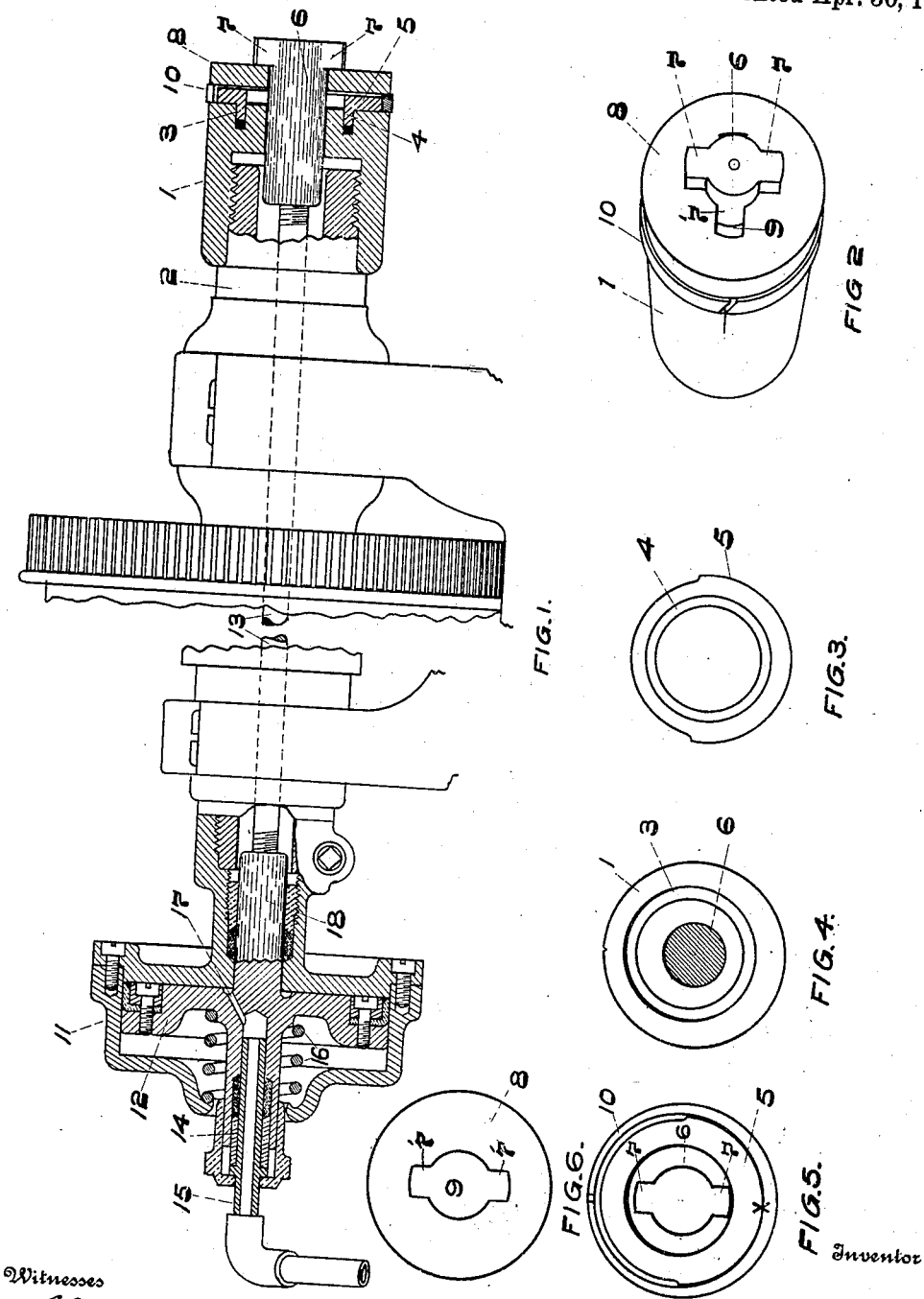

DAVID F. DOMIZI, OF FRANKLIN, PENNSYLVANIA.

CHUCK FOR PISTON-RINGS.

1,024,882.

Specification of Letters Patent. Patented Apr. 30, 1912.

Application filed March 18, 1911. Serial No. 615,379.

*To all whom it may concern:*

Be it known that I, DAVID F. DOMIZI, citizen of the United States, residing at Franklin, in the county of Venango and State of Pennsylvania, have invented certain new and useful Improvements in Chucks for Piston-Rings, of which the following is a specification.

The object, construction and operation of my improved chuck are herein set forth with sufficient clearness to enable those skilled in the art to which it relates to make and use the same.

In the drawings I have illustrated one way in which my improved chuck may be constructed and operated, the various figures of said drawings being as follows:

Figure 1 shows my chuck attached to the live spindle of a lathe, or other machine-tool, together with a pneumatic appliance arranged to operate said chuck. Fig. 2 is a perspective view of my chuck disconnected from the spindle of said machine-tool. Fig. 3 is a face view of a centering device which I employ in said chuck. Fig. 4 is a face view of the chuck body. Fig. 5 is a face view of my chuck with a piston ring in position to be clamped, and with the clamping plate removed. Fig. 6 is the clamping plate.

The object of my invention is to provide a convenient, efficient, easily and quickly operated chuck for the accurate and final finishing of the periphery of piston rings, though said chuck may be employed for the finishing or turning of other annuli of like nature. The construction by means of which I attain said objects is substantially as follows:—I construct a cylindrical body 1 which is arranged to be attached to the live spindle 2 of a lathe, grinding machine, or other suitable machine-tool. In the outer, perpendicular clamping face of said body I form an annular groove 3 for the reception of the annular tongue 4 of a centering ring 5, the precise object of which will presently be set forth. A longitudinally-movable clamping-rod 6 passes through said body 1 and projects somewhat beyond the clamping face thereof. The outer end of said rod 6 is formed into a head consisting of two diametrically opposed engaging lugs 7, 7. A clamping ring 8, has a central opening 9 therein which conforms to the shape of the head of said bar 6 and is adapted to pass over said head and to be engaged thereby when turned to a non-registering position, substantially as shown in Fig. 2. Said plate has also a perpendicular clamping face arranged in juxtaposition to the clamping face of body 1, and between these two opposing faces the ring 10, or other article is clamped when the chuck is in operation.

In Figs. 1, 2 and 5, I have shown a piston ring 10 in position in my chuck, which ring is placed in position in said chuck, also removed therefrom, by removing the clamping plate 8. Plate 8 may be readily removed by turning same so that the lug-slots 7′, 7′, of the opening 9, are in register with the lugs 7. After ring 10 is in position, the clamping ring or plate 8 is replaced and turned to the position shown in Fig. 2, and by causing lugs 7 to bear firmly against said plate,—by means presently to be explained— said ring 10 is held firmly in position, so that its periphery may be finished as desired. For the purpose of positioning ring 10 centrally and accurately in the chuck, I provide a centering ring 5, the annular tongue of which enters the annular groove 3 in body 1, and when ring 10 is placed over the same, it is properly and centrally positioned by causing a contact of ring 10 with ring 5 at the point indicated by "X" in Fig. 5. Ring 5 is made removable so that centering rings of various sizes may be used, thus readily adapting the chuck to be used with rings which vary somewhat in diameter.

Clamping rod 6 is actuated longitudinally by means of an actuating head, which is attached to the opposite end of spindle 2. Said head consists of a cylinder 11 in which is a fluid-actuated piston 12, arranged to be directly connected by an intermediate stem 13 to rod 6. The outer end of piston 12 is provided with a sleeve 14, into which an induction and eduction pipe 15 is inserted, through a suitable stuffing gland to prevent leakage of the actuating fluid. Sleeve 14 is revoluble upon pipe 15. Piston 12 is held in the non-clamping position by means of the spring 16, and when air is admitted through pipe 15 it passes through duct 17 and causes piston to move in the direction away from the chuck so that lugs 7 bear firmly upon plate 8, and causes said plate to clamp ring 10 firmly between the opposing vertical faces of said plate and the body 1. When the air or other actuating fluid is released and permitted to escape from behind the piston 12, spring 16 returns said piston to its normal position, and causes lugs 7 to release plate 8 sufficiently so that it may be turned to the removal position, as above stated.

Stem 13 is screw-threaded at either end and screws into rod 6 and into stem 18 of the piston, and by this construction an adjustability of length is provided for in the clamping rod, so that rings of various thicknesses may be clamped in the chuck.

In placing a ring 10 in my improved chuck, I employ the closing and chucking device, shown in an application for Letters Patent of the United States, filed by me on the 18th day of March, 1911, Serial No. 615,380.

What I claim and desire to secure by Letters Patent is:—

A chuck for piston rings consisting of a body adapted to be attached to the live spindle of a machine tool and having a clamping face perpendicular to the axis of said spindle, ring-centering means affixed to said face and arranged to secure the proper position of the periphery of a piston ring by contact with a portion of its inner face, a longitudinally-movable clamping rod passing through said body and provided upon its outer end with a head consisting of laterally-projecting lugs, a clamping-plate adapted to be engaged by said rod head, and having a central opening arranged for the passage of said head, and means for longitudinally actuating said rod for the purpose set forth.

In testimony whereof I affix my signature in presence of two witnesses.

DAVID F. DOMIZI.

Witnesses:
D. I. McVay,
E. R. Inman.